(12) United States Patent
Kotikalapudi et al.

(10) Patent No.: US 10,148,590 B2
(45) Date of Patent: Dec. 4, 2018

(54) METHOD AND SYSTEM FOR DYNAMICALLY UNBLOCKING CUSTOMERS IN CRITICAL WORKFLOWS USING PRE-DEFINED UNLOCK CODES

(71) Applicant: Intuit Inc., Mountain View, CA (US)

(72) Inventors: Prabhakar Srinivas Kotikalapudi, Bangalore (IN); Sunil Kumar Alachi, Kannur (IN); Vatsal Singh, Bangalore (IN)

(73) Assignee: Intuit Inc., Mountain View, CA (US)

( * ) Notice: Subject to any disclaimer, the term of this patent is extended or adjusted under 35 U.S.C. 154(b) by 183 days.

(21) Appl. No.: 14/974,076

(22) Filed: Dec. 18, 2015

(65) Prior Publication Data

US 2017/0118138 A1   Apr. 27, 2017

(30) Foreign Application Priority Data

Oct. 23, 2015   (IN) ........................... 1106/KOL/2015

(51) Int. Cl.
  *H04L 12/927* (2013.01)
  *H04L 12/24* (2006.01)
  *H04L 29/06* (2006.01)

(52) U.S. Cl.
  CPC .......... *H04L 47/80* (2013.01); *H04L 41/5074* (2013.01); *H04L 63/00* (2013.01)

(58) Field of Classification Search
  None
  See application file for complete search history.

(56) References Cited

U.S. PATENT DOCUMENTS

| | | | |
|---|---|---|---|
| 7,184,967 B1* | 2/2007 | Mital | G06Q 10/06316 705/7.26 |
| 8,108,878 B1* | 1/2012 | Pulsipher | G06F 9/524 718/100 |
| 9,183,092 B1* | 11/2015 | Marr | G06F 11/1417 |
| 2008/0263404 A1* | 10/2008 | Vidiyala | G06F 11/0748 714/38.14 |
| 2009/0198548 A1* | 8/2009 | Kohler | G06Q 10/06 705/7.27 |
| 2010/0057677 A1* | 3/2010 | Rapp | G06F 9/4446 707/E17.014 |

(Continued)

*Primary Examiner* — Thomas Dailey
(74) *Attorney, Agent, or Firm* — Hawley Troxell Ennis & Lawley LLP; Philip McKay

(57) ABSTRACT

Pre-defined unlock codes are generated that are associated with defined access related error codes. When an access issue is encountered, the pre-defined unlock code associated with the received error code is provided to the blocked user. When the blocked user provides the pre-defined unlock code associated with the received error code, the user is provided access to the software application on a temporary basis. Therefore, embodiments of the present disclosure provide a technical solution to the long standing technical problem in the workflow application environment of users of a software application getting stuck and blocked from making progress with their workflows due to access and/or critical issues, without the need for applying a permanent data fix, releasing a patch, or developing, releasing, and/or installing a new application version, at least until a long-term solution can be formulated and implemented.

38 Claims, 3 Drawing Sheets

(56) References Cited

U.S. PATENT DOCUMENTS

| | | | |
|---|---|---|---|
| 2010/0199132 A1* | 8/2010 | Compton | G06F 11/0709 |
| | | | 714/57 |
| 2014/0277902 A1 | 9/2014 | Koch | |
| 2014/0337243 A1* | 11/2014 | Dutt | G06Q 50/265 |
| | | | 705/325 |
| 2014/0380105 A1* | 12/2014 | Michel | G06F 11/0769 |
| | | | 714/57 |
| 2015/0052122 A1* | 2/2015 | Landry | G06F 11/0706 |
| | | | 707/723 |
| 2015/0133076 A1 | 5/2015 | Brough | |
| 2015/0363741 A1 | 12/2015 | Chandra et al. | |
| 2016/0239847 A1 | 8/2016 | Arvapally et al. | |

\* cited by examiner

METHOD AND SYSTEM FOR DYNAMICALLY UNBLOCKING CUSTOMERS IN CRITICAL WORKFLOWS USING PRE-DEFINED UNLOCK CODES

BACKGROUND

Software applications and systems have become indispensable tools for helping consumers/users, i.e., users of the software applications, perform a wide variety of tasks in their daily professional and personal lives. Currently, numerous types of desktop, web-based, and cloud-based software applications are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

More recently there has been an increasing interest in workflow applications as a way of supporting complex processes in modern business and mobile environments. Given the nature of the environment and the technology involved, workflow applications are inherently distributed and pose many challenges to system designers. In most cases, a client/server architecture is used in which knowledge about the processes being executed is centralized in one node to facilitate monitoring, auditing, and to simplify synchronization.

One complicated, unresolved, and long standing technical problem associated with the workflow application environment is that customers, i.e., software application users, often find themselves stuck, i.e., blocked from making progress with their workflows, due to subscription issues, version issues, roles and permissions issues, and other access issues, referred to herein as access and/or critical issues. This inevitably results in negative user experiences, customer frustration, and time and productivity loss. This, in turn, leads to loss of business for the software application provider and loss of productivity for the user of the software application. Clearly this is not an ideal situation.

What is needed is a method and system for unblocking/unlocking authorized customers/users of a software application at least until a long-term solution to the issue can be formulated and implemented.

SUMMARY

Embodiments of the present disclosure provide a technical solution to the long standing technical problem in the workflow application environment of users of a software application getting stuck and blocked from making progress with their workflows due to access and/or critical issues. In one embodiment, the solution is provided without requiring an immediate a permanent data fix, a patch release, or developing, releasing, and/or installing a new application version, at least until a long-term solution can be formulated and implemented.

In accordance with one embodiment, a software application is provided to one or more users. In one embodiment, pre-defined unlock code data representing pre-defined unlock codes to be associated with defined error codes is generated. In one embodiment, portions of the pre-defined unlock code data representing specific pre-defined unlock codes are correlated with the associated error code data representing the associated error codes.

In one embodiment, user critical issue report data is received indicating a user has encountered an access issue or other critical issue. In one embodiment, error code data associated with the user critical issue report data is obtained from a user computing system associated with the user of the software application. In one embodiment, the error code data associated with the user critical issue report data is analyzed to determine a pre-defined unlock code associated with the error code data of the user critical issue report data.

In one embodiment, authentication data is obtained to authenticate the user based on analysis of the authentication data, and the user is authenticated. In one embodiment, the user and/or the user computing system is provided access to a portion of the pre-defined unlock code data representing the pre-defined unlock code determined to be associated with the error code data.

In one embodiment, the pre-defined unlock code data representing the pre-defined unlock code determined to be associated with the error code data is entered by the user through the software application and/or the user computing system.

In one embodiment, once the pre-defined unlock code data representing the pre-defined unlock code determined to be associated with the error code data of the user critical issue report data is received from the user, the user is allowed to proceed to utilize the application from the user computing system.

The disclosed method and system for dynamically unblocking customers in critical workflows using pre-defined unlock codes provides a technical solution to the long standing technical problem in the workflow application environment of users of a software application getting stuck and blocked from making progress with their workflows due to access and/or critical issues until a long-term solution can be formulated and implemented.

The disclosed method and system for dynamically unblocking customers in critical workflows using pre-defined unlock codes does not encompass, embody, or preclude other forms of innovation in the area of workflow applications. In addition, the disclosed method and system for dynamically unblocking customers in critical workflows using pre-defined unlock codes is not related to any fundamental economic practice, fundamental data processing practice, mental steps, or pen and paper based solution, and is, in fact, directed to providing solutions to relatively new problems associated with distributed workflow applications. Consequently, the disclosed method and system for dynamically unblocking customers in critical workflows using pre-defined unlock codes is not directed to, does not encompass, and is not merely, an abstract idea or concept.

In addition, the disclosed method and system for dynamically unblocking customers in critical workflows using pre-defined unlock codes provides for significant improvements to the technical fields of customer support, information dissemination, software implementation, user experience, data processing, data management, distributed workflow applications, client server applications, and real time application fixes.

In addition, the disclosed method and system for dynamically unblocking customers in critical workflows using pre-defined unlock codes provides for the processing of only relevant portions of data and data analysis, such as specific error codes and pre-defined unlock codes, before the data is further analyzed, processed, and/or transmitted/distributed. Consequently, using the disclosed method and system for dynamically unblocking customers in critical workflows using pre-defined unlock codes results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing the method and system for dynamically unblocking customers in critical workflows using pre-defined unlock codes.

Figure 1:
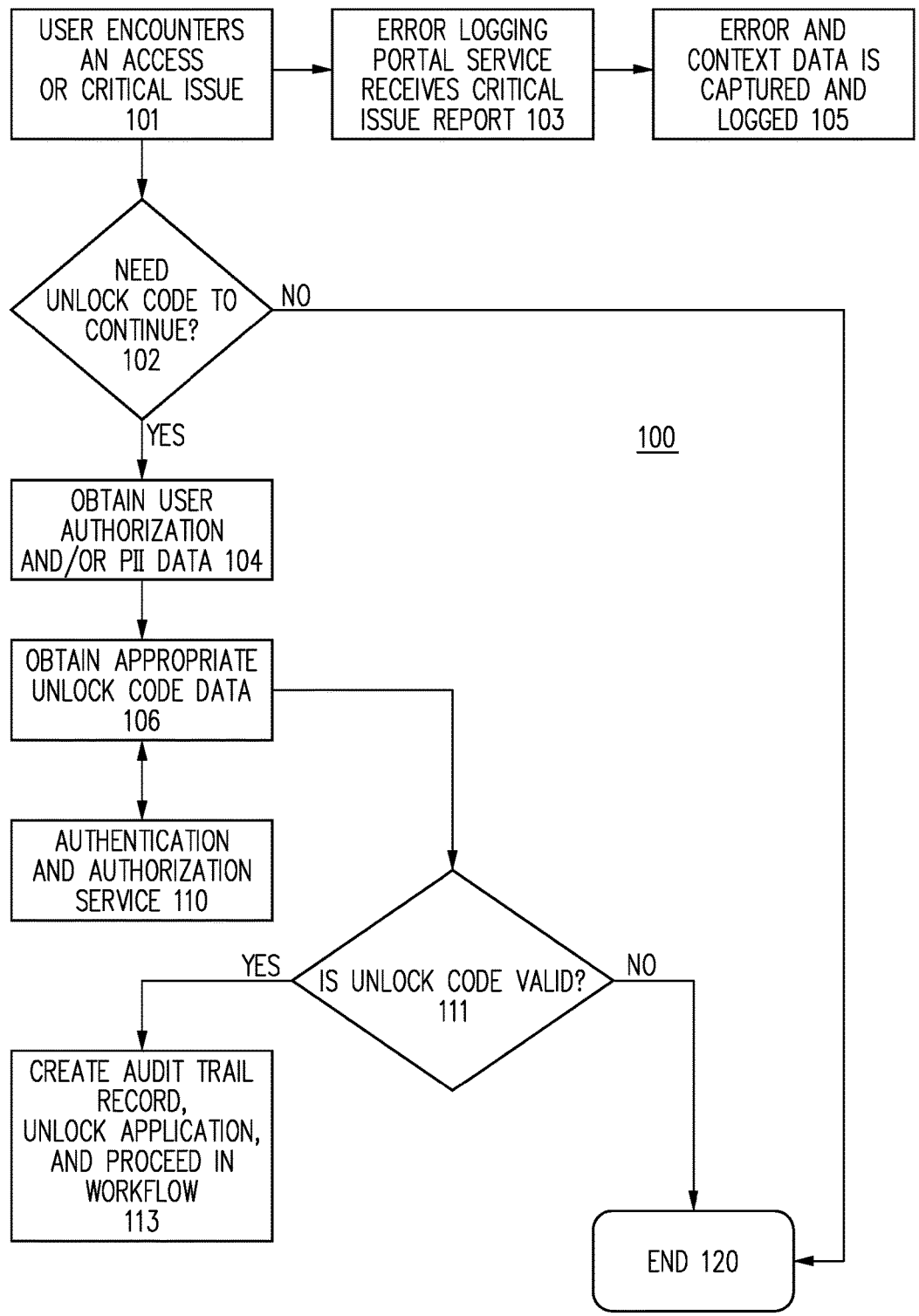
FIG. 1 shows a generalized and high level operational flow diagram of a method and system for dynamically unblocking customers in critical workflows using pre-defined unlock codes, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

Term Definitions

Herein, the terms "software system" and "software application" are used interchangeably and can be, but are not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the terms "software system" and "software application" include, but are not limited to the following: computing system implemented, and/or online, and/or web-based, personal and/or business tax preparation systems, services, packages, programs, modules, or applications; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filing or as developed later.

Specific examples of "software systems" and "software applications" include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software applications discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience" includes not only the data entry and question submission process, but also other user experience features provided or displayed to the user such as, but not limited to the following: interfaces; images; backgrounds; avatars; highlighting mechanisms; icons; and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the method and system for dynamically unblocking customers in critical workflows using pre-defined unlock codes described herein, and/or a person and/or entity that interfaces with, and/or to whom information is provided by, the method and system for dynamically unblocking customers in critical workflows using pre-defined unlock codes described herein, and/or a legal guardian of person and/or entity that interfaces with, and/or to whom information is provided by, the method and system for dynamically unblocking customers in critical workflows using pre-defined unlock codes described herein, and/or an authorized agent of any party and/or person and/or entity that interfaces with, and/or to whom information is provided by, the method and system for dynamically unblocking customers in critical workflows using pre-defined unlock codes described herein. For instance, in various embodiments, a user can be, but is not limited to, a person, a commercial entity, an application, a service, and/or a computing system.

As used herein, the term "action message" includes messages used to send customized notification payloads that cause specific operations or actions to occur when a notification is received or activated and that logically, and operationally, connect what a software application running on user computing systems does, and what operations it performs on user computing systems, with what the application provider/application server sends through the action message.

As used herein, the term "action message system" includes an action message framework that represents and creates a cooperation between a software application user's computing system and the action messages sent to it through the software application. Consequently, as used herein, the terms "action message system" and "action message framework" do not necessarily mean a mobile or server-side technology on its own, but again rather a cooperation between the user device and the action messages sent to it.

As used herein the term "unlock code" includes electronic data representations of passwords, permissions, secrets, and/or any access or bypass/unlock mechanism that is capable of being processed by a processor, and/or stored in a memory, and/or transmitted between computing systems, and/or is otherwise machine readable.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Embodiments of the present disclosure provide a technical solution to the long standing technical problem in the workflow application environment of users of a software application getting stuck and blocked from making progress with their workflows due to access and/or critical issues. In various embodiments, this solution is provided without applying a permanent data fix, releasing a patch, or developing, releasing, and/or installing a new application version, at least until a long-term solution can be formulated and implemented.

According to one embodiment, a software application is provided to one or more users on one or more computing systems.

As noted above, herein, the term software application includes, but is not limited to the following: computing system implemented, and/or online, and/or web-based, personal and/or business tax preparation systems, services, packages, programs, modules, or applications; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software applications include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software applications discussed herein, and/or known to those of skill in the art at the time of filing, and/or as developed after the time of filing.

In one embodiment, pre-defined unlock code data representing pre-defined unlock codes to be associated with defined error codes is generated.

As used herein the term "unlock code" includes electronic data representations of passwords, permissions, secrets, and/or any access or bypass/unlock mechanism that is capable of being processed by a processor, and/or stored in a memory, and/or transmitted between computing systems, and/or is otherwise machine readable.

In one embodiment, the pre-defined unlock codes are unlock codes generated to unlock, or unblock situations where users of the software system are commonly blocked from making progress with their workflows; typically due to subscription issues, version issues, roles and permissions issues, and other access issues, referred to herein as access and/or critical issues.

In one embodiment, each pre-defined unlock code is associated with, e.g., unlocks, a specific block in the user workflow identified by a specific defined error code. Consequently, in one embodiment, portions of the pre-defined unlock code data representing specific unlock codes are correlated with specific error codes represented by specific error code data associated with critical issue report data received from a user computing system.

In various embodiments, the defined error codes include an error code indicating an invalid subscription error associated with the user for the software application.

In various embodiments, the defined error codes include an error code indicating an expired subscription error associated with the user for the software application.

In various embodiments, the defined error codes include an error code indicating a permissions-based entitlement error associated with the user for the software application.

In various embodiments, the defined error codes include an error code indicating a role-based entitlement error associated with the user for the software application.

In one embodiment, the unlock code data also includes use limitation data indicating a limit on the number of times the unlock code data can be used, and/or defined timeframes when the unlock code data can be used, and/or defined conditions or contexts when the unlock code data can used.

In one embodiment, the pre-defined unlock code data is stored in a pre-defined unlock code database provided by, and/or maintained by, the software system provider.

In one embodiment, the pre-defined unlock code data is provided to a user through the software application and is stored on the user computing systems until needed. In one embodiment, the pre-defined unlock code data is provided to the user via separate message and/or data transfer mechanisms.

In one embodiment, a user of the software application encounters an access blockage or other critical issue. In one embodiment, user critical issue report data is then received from a user of the software application, and/or a user computing system associated with the user of the software application, indicating the user has encountered the access issue or other critical issue. In one embodiment, user error code data associated with the user critical issue is then obtained and logged from a user computing system associated with the user of the software application. In one embodiment, error code data associated with the user critical issue is obtained using an error code portal service that captures the user error code data.

In one embodiment, the obtained user error code data is stored. In one embodiment, the obtained user error code data is stored in a user error code data portion of a memory.

In one embodiment, the obtained user error code data is analyzed to determine if the obtained user error code data matches error code data associated with any of the pre-defined unlock code data.

In one embodiment, if a match is found between the error code data associated with any of a portion of the pre-defined unlock code data representing a matched pre-defined unlock code, authentication data is obtained to authenticate the user. If, based on analysis of the authentication data, and the user is authenticated, the user and/or the user computing system is provided access to a portion of the pre-defined unlock code data representing the pre-defined unlock code determined to be associated with the error code data.

In one embodiment, an audit trial record data associated with the pre-defined unlock code data representing the pre-defined unlock code determined to be associated with the error code data associated with the user critical issue report data is generated and stored.

In one embodiment, the user is provided access to the portion of the pre-defined unlock code data representing the pre-defined unlock code determined to be associated with the error code data via any method for transferring data discussed herein, and/or as known in the art at the time of filing, and/or as developed after the time of filing.

In one embodiment, the user is provided access to the portion of the pre-defined unlock code data representing the pre-defined unlock code determined to be associated with the error code data using one or more action messages and/or pre-defined unlock code data. To this end, in one embodiment, in addition to the software application, a message based action system associated with the software application is provided using one or more computing systems.

As noted above, in one embodiment, the provided message based action system is a loosely coupled message based action framework for dynamically unblocking customers in critical workflows using pre-defined unlock codes that allows the developers and product managers to dynamically control the software application behavior based on the action messages and message actions defined on the server and these message actions can be targeted to a specific user, or a set of users, based on the criteria and error codes defined on the server.

As noted above, as used herein, the term "action message" includes messages used to send customized notification payloads that cause specific operations or actions to occur when a notification is received or activated and that logically, and operationally, connect what the provided software application running on user computing systems does, and what operations it performs on user computing systems, with what the software application provider/software application server sends through the action message.

As also noted above, as used herein, the term "action message system" includes an action message framework that represents and creates a cooperation between the provided software application user's computing system and the action messages sent to the provided software application user's computing system through the software application itself. Consequently, as used herein, the terms "action message system" and "action message framework" do not necessarily mean a mobile or server-side technology on its own, but rather a cooperation between the provided software application user's computing system and the action messages sent to it. Consequently, using an "action message system" the provided software application user's computing system needs to know how to perform tasks indicated in an action message by name, with optional arguments, in certain distinct situations, with an optional result value.

Consequently, in one embodiment, each message action of an action message includes at least the following attributes: condition for the action; context; and action. In one embodiment, the condition for the action attribute supports logical expression with the ability to use any exposed variables in the software application such as, but not limited to, companyId, userId, version code, etc., global and context based. In addition, in one embodiment, a variable called "now" that represents the time in milliseconds from Jan. 1, 1970 midnight GMT is also available.

In one embodiment, the context attribute defines the context or placement when/where the message actions will be executed in the software application, such as, but not limited to, when the software application starts, when an error occurs, or during upgrade flow, etc.

In one embodiment, the actions are predefined actions available in the software application. In one embodiment, actions are identified by name and are registered with the action message system/framework.

In one embodiment, action messages are delivered to the software application user's computing system, i.e., the client, through software application settings. In one embodiment, the key is actionmessages.expr. In one embodiment, each available action includes; 1. A name data field indicating the defined name of the action; 2. A one-time message (otm) data field indicating if the action is executed only once, or some other use limitation; and 3. An action JSON field indicating any action specific JSON as a string.

As an illustrative example of one embodiment, the actions supported include, but are not limited to, an action and action message action attribute providing a text, or other message form, directing the user to obtain pre-defined unlock codes that appears on the user computing system.

As an illustrative example of one embodiment, the actions supported include, but are not limited to, an action and action message action attribute providing the user one or more pre-defined unlock codes on the user computing system.

As an illustrative example of one embodiment, the actions supported include, but are not limited to, an action and action message action attribute that accesses unlock codes pre-deployed in the software application running on the user computing system.

As an illustrative example of one embodiment, other actions supported include, but are not limited to, an alert action, e.g., an action that shows an alert dialog with ok and cancel buttons. In one embodiment, the following attributes of the alert can be customized:
   a. title—the title for the dialog;
   b. message—the message for the dialog;
   c. okCaption—an ok button caption;
   d. cancelCaption—a cancel button caption;
   e. okAction—the definition of the action that needs to be executed when the user clicks the ok button; and
   f. cancelAction—the definition of the action that needs to be executed when the user clicks the cancel button.

As an illustrative example of one embodiment, the actions supported include, but are not limited to, a fullsync action that triggers a full data synchronization.

As an illustrative example of one embodiment, the actions supported include, but are not limited to, a skipsyncerror action that skips a synchronization (sync) error. In one embodiment, the skipsyncerror action is used for parsing errors.

As an illustrative example of one embodiment, the actions supported include, but are not limited to, an alogsyncerror action that logs sync error details including logging JSON response data.

As an illustrative example of one embodiment, the actions supported include, but are not limited to, a goforupgrade action that takes the user to the software application upgrade flow.

As an illustrative example of one embodiment, the actions supported include, but are not limited to, a dynamic action that dynamically adds an action message to execute at a later time or event.

Although specific illustrative examples of actions are discussed above, those of skill in the art will recognize that different, more, or less, actions can be defined and implemented using different, similar, or the same nomenclature/symbols and functionality. Consequently, the specific action examples discussed herein are presented as illustrative examples only and do not limit the scope of the claims presented below.

In one embodiment, once the pre-defined unlock code data representing the pre-defined unlock code determined to be associated with the error code data is accessed by the user, the user obtains and enters the pre-defined unlock code data representing the pre-defined unlock code determined to be associated with the error code data through the software application and/or the user computing system.

In one embodiment, once the pre-defined unlock code data representing the pre-defined unlock code determined to be associated with the error code data of the user critical issue report data is received from the user, the user is allowed to proceed to utilize the application from the user computing system, at least until a long-term solution can be formulated and implemented.

FIG. 1 shows a generalized operational workflow 100 of a method and system for dynamically unblocking customers in critical workflows using pre-defined unlock codes, in accordance with one embodiment.

Referring to FIG. 1, in one embodiment, at USER ENCOUNTERS AN ACCESS OR CRITICAL ISSUE 101, a user of the software application encounters an access blockage or other critical issue.

In one embodiment, at ERROR LOGGING PORTAL SERVICE RECEIVES CRITICAL ISSUE REPORT 103, a user critical issue report is received from a user of the software application, and/or a user computing system associated with the user of the software application, indicating the user has encountered the access issue or other critical issue.

In one embodiment, at ERROR AND CONTEXT DATA IS CAPTURED AND LOGGED 105, user error code data associated with the user critical issue of USER ENCOUNTERS AN ACCESS OR CRITICAL ISSUE 101 is obtained and logged from a user computing system associated with the user of the software application. In one embodiment, the user error code data associated with the user critical issue is obtained using an error logging portal service that captures the user error code data.

In one embodiment, the obtained user error code data is stored. In one embodiment, at NEED UNLOCK CODE TO CONTINUE? 102, a determination is made as to whether an unlock code, represented by unlock code data, is required. In one embodiment, if a determination is made at NEED UNLOCK CODE TO CONTINUE? 102 that an unlock code, represented by unlock code data, is not required, process proceeds to END 120.

On the other hand, if a determination is made at NEED UNLOCK CODE TO CONTINUE? 102 that an unlock code, represented by unlock code data, is required, process proceeds to OBTAIN USER AUTHORIZATION AND/OR PII DATA 104.

In one embodiment, at OBTAIN USER AUTHORIZATION AND/OR PII DATA 104 various personal identity information, and/or other authorization data is obtained.

In one embodiment, AUTHENTICATION AND AUTHORIZATION SERVICE 110 performs several functions/checks such as, but not limited to: checking whether the user is authorized to use the unlock mechanism; checking whether the feature and error code qualify for unlock/override; and/or checking the number of times the unlock code/feature has been used in a defined time interval, e.g., has any use limitation been exceeded.

In one embodiment, if the rules and checks of AUTHENTICATION AND AUTHORIZATION SERVICE 110 are satisfied, an unlock code that is valid for a defined time interval, and/or number of uses, is provided to OBTAIN APPROPRIATE UNLOCK CODE DATA 106. In one embodiment, at OBTAIN APPROPRIATE UNLOCK CODE DATA 106 the portion of unlock code data associated with the error code data is obtained and entered at IS UNLOCK CODE VALID? 111.

In one embodiment, at IS UNLOCK CODE VALID? 111 a determination is made as to whether the unlock code is valid. If, at IS UNLOCK CODE VALID? 111 a determination is made that the unlock code is valid, process proceeds to CREATE AUDIT TRAIL RECORD, UNLOCK APPLICATION, AND PROCEED IN WORKFLOW 113.

On the other hand, if at IS UNLOCK CODE VALID? 111 a determination is made that the unlock code is not valid, process proceeds to END 120.

The disclosed method and system for dynamically unblocking customers in critical workflows using pre-defined unlock codes provides for dynamically unblocking customers in critical workflows using pre-defined unlock codes. Therefore, embodiments of the present disclosure provide a technical solution to the long standing technical problem in the workflow application environment of users of a software application getting stuck and blocked from making progress with their workflows due to access and/or critical issues. In various embodiments, this solution is provided without applying a permanent data fix, releasing a patch, or developing, releasing, and/or installing a new application version, at least until a long-term solution can be formulated and implemented.

The disclosed method and system for dynamically unblocking customers in critical workflows using pre-defined unlock codes does not encompass, embody, or preclude other forms of innovation in the area of workflow applications. In addition, the disclosed method and system for dynamically unblocking customers in critical workflows using pre-defined unlock codes is not related to any fundamental economic practice, fundamental data processing practice, mental steps, or pen and paper based solution. In fact, the disclosed embodiments are directed to providing solutions to relatively new problems associated with distributed workflow applications. Consequently, the disclosed method and system for dynamically unblocking customers in critical workflows using pre-defined unlock codes is not directed to, does not encompass, and is not merely, an abstract idea or concept.

In addition, the disclosed method and system for dynamically unblocking customers in critical workflows using pre-defined unlock codes provides for significant improvements to the technical fields of customer support, information dissemination, software implementation, user experience, data processing, data management, distributed workflow applications, client server applications, and real time application fixes.

In addition, the disclosed method and system for dynamically unblocking customers in critical workflows using pre-defined unlock codes provides for the processing of only relevant portions of data and data analysis, such as specific error codes and pre-defined unlock codes, before the data is further analyzed, processed, and/or transmitted/distributed. Consequently, using the disclosed method and system for dynamically unblocking customers in critical workflows using pre-defined unlock codes results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing the method and system for dynamically unblocking customers in critical workflows using pre-defined unlock codes.

Process

In accordance with one embodiment, a technical solution to the long standing technical problem in the workflow application environment of users of a software application getting stuck and blocked from making progress with their workflows due to access and/or critical issues until a long-term solution can be formulated and implemented is provided.

In accordance with one embodiment, a software application is provided to one or more users and pre-defined unlock code data representing pre-defined unlock codes to be associated with defined error codes is generated. In one embodiment, portions of the pre-defined unlock code data representing specific pre-defined unlock codes are correlated with the associated error code data representing the associated error codes.

In one embodiment, when a user of the software application encounters an access or other critical issue, user critical issue report data is received indicating the user has encountered the access issue or other critical issue. In one embodiment, error code data associated with the user critical issue report data is then obtained from a user computing system associated with the user. In one embodiment, the error code data associated with the user critical issue report data is analyzed to determine a pre-defined unlock code associated with the error code data.

In one embodiment, authentication data is obtained to authenticate the user based on analysis of the authentication data. In one embodiment, the user and/or the user computing system is then provided access to a portion of the pre-defined unlock code data representing the pre-defined unlock code determined to be associated with the error code data of the user critical issue report data. In one embodiment, the pre-defined unlock code data representing the pre-defined unlock code determined to be associated with the error code data is then entered or provided by the user through the software application and/or the user computing system.

In one embodiment, once the pre-defined unlock code data representing the pre-defined unlock code determined to be associated with the error code of the user critical issue report data is received from the user, the user is allowed to proceed to utilize the application from the user computing system, i.e., the software application workflow in unlocked.

Figure 2:
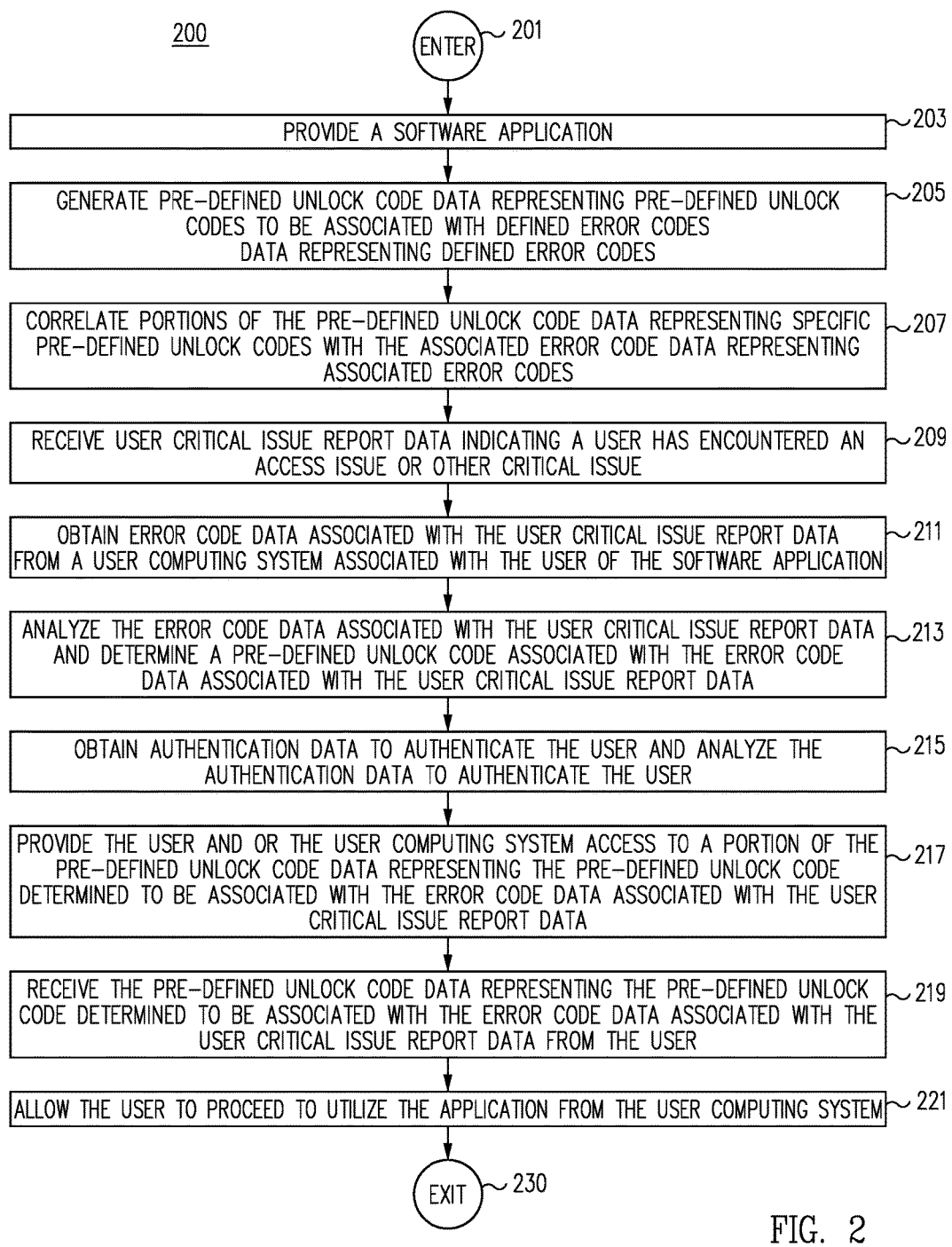
FIG. 2 is a flow chart representing one example of a generalized process for dynamically unblocking customers in critical workflows using pre-defined unlock codes, in accordance with one embodiment.

FIG. 2 is a flow chart representing one example of a process 200 for dynamically unblocking customers in critical workflows using pre-defined unlock codes in accordance with one embodiment.

As seen in FIG. 2, process 200 for dynamically unblocking customers in critical workflows using pre-defined unlock codes begins at ENTER OPERATION 201 and process flow proceeds to PROVIDE A SOFTWARE APPLICATION OPERATION 203.

In one embodiment, at PROVIDE A SOFTWARE APPLICATION OPERATION 203, a software application is provided for use by one or more users. In various embodiments, the software application of PROVIDE A SOFTWARE APPLICATION OPERATION 203 is any software application as discussed herein, and/or as known at the time of filling, and/or as developed after the time of filing.

In one embodiment, once a software application is provided at PROVIDE A SOFTWARE APPLICATION OPERATION 203, process flow proceeds to GENERATE PRE-DEFINED UNLOCK CODE DATA REPRESENTING PRE-DEFINED UNLOCK CODES TO BE ASSOCIATED WITH DEFINED ERROR CODES DATA REPRESENTING DEFINED ERROR CODES OPERATION 205.

In one embodiment, at GENERATE PRE-DEFINED UNLOCK CODE DATA REPRESENTING PRE-DEFINED UNLOCK CODES TO BE ASSOCIATED WITH DEFINED ERROR CODES DATA REPRESENTING DEFINED ERROR CODES OPERATION 205, pre-defined unlock code data representing pre-defined unlock codes to be associated with defined error codes is generated.

As used herein the term "unlock code" includes electronic data representations of passwords, permissions, secrets, and/or any access or bypass/unlock mechanism that is capable of being processed by a processor, and/or stored in a memory, and/or transmitted between computing systems, and/or is otherwise machine readable.

In one embodiment, the pre-defined unlock codes are unlock codes generated at GENERATE PRE-DEFINED UNLOCK CODE DATA REPRESENTING PRE-DEFINED UNLOCK CODES TO BE ASSOCIATED WITH DEFINED ERROR CODES DATA REPRESENTING DEFINED ERROR CODES OPERATION 205 to unlock, or unblock, types of instances where users of the software application are commonly blocked from making progress with their workflows; typically due to subscription issues, version issues, roles and permissions issues, and other access issues, referred to herein as access and/or critical issues.

In one embodiment, once pre-defined unlock code data representing pre-defined unlock codes to be associated with defined error codes is generated at GENERATE PRE-DEFINED UNLOCK CODE DATA REPRESENTING PRE-DEFINED UNLOCK CODES TO BE ASSOCIATED WITH DEFINED ERROR CODES DATA REPRESENTING DEFINED ERROR CODES OPERATION 205, process flow proceeds to CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207.

In one embodiment, at CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207, portions of the pre-defined unlock code data representing specific unlock codes are correlated with specific error codes represented by specific error code data associated with critical issue report data received from a user computing system.

In one embodiment, each pre-defined unlock code of GENERATE PRE-DEFINED UNLOCK CODE DATA REPRESENTING PRE-DEFINED UNLOCK CODES TO BE ASSOCIATED WITH DEFINED ERROR CODES DATA REPRESENTING DEFINED ERROR CODES OPERATION 205 is associated with, e.g., unlocks, a specific block in the user workflow identified by a specific defined error code. Consequently, in one embodiment, at CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207 portions of the pre-defined unlock code data representing specific unlock codes are correlated with specific error codes represented by specific error code data associated with critical issue report data received from a user computing system.

In various embodiments, the defined error codes of CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207 include an error code indicating an invalid subscription error associated with the user for the software application.

In various embodiments, the defined error codes of CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207 include an error code indicating an expired subscription error associated with the user for the software application.

In various embodiments, the defined error codes of CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207 include an error code indicating a permissions-based entitlement error associated with the user for the software application.

In various embodiments, the defined error codes of CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207 include an error code indicating a role-based entitlement error associated with the user for the software application.

In one embodiment, the unlock code data of CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207 also includes use limitation data indicating a limit on the number of times the unlock code data can be used, and/or defined timeframes when the unlock code data can be used, and/or defined conditions or contexts when the unlock code data can used.

In one embodiment, at CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207 the pre-defined unlock code data is stored in a pre-defined unlock code database provided by, and/or maintained by, the software application provider.

In one embodiment, at CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207 the pre-defined unlock code data is provided to a user through the software application and is stored on the user computing systems until needed. In one embodiment, the pre-defined unlock code data is provided to the user via separate message and/or data transfer mechanisms.

In one embodiment, once portions of the pre-defined unlock code data representing specific unlock codes are correlated with specific error codes represented by specific error code data associated with critical issue report data received from a user computing system at CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207, process flow proceeds to RECEIVE USER CRITICAL ISSUE REPORT DATA INDICATING A USER HAS ENCOUNTERED AN ACCESS ISSUE OR OTHER CRITICAL ISSUE OPERATION 209.

In one embodiment, at RECEIVE USER CRITICAL ISSUE REPORT DATA INDICATING A USER HAS ENCOUNTERED AN ACCESS ISSUE OR OTHER CRITICAL ISSUE OPERATION 209, a user of the software application of PROVIDE A SOFTWARE APPLICATION OPERATION 203 encounters an access blockage or other critical issue. In one embodiment, user critical issue report data is then received from a user of the software application, and/or a user computing system associated with the user of the software application, indicating the user has encountered the access issue or other critical issue.

As noted above, in various embodiments the access issue or other critical issue encountered at RECEIVE USER CRITICAL ISSUE REPORT DATA INDICATING A USER HAS ENCOUNTERED AN ACCESS ISSUE OR OTHER CRITICAL ISSUE OPERATION 209 can be, but is not limited to, an invalid subscription error associated with the user for the software application, an expired subscription error associated with the user for the software application, a permissions-based entitlement error associated with the user for the software application, a role-based entitlement error associated with the user for the software application, and/or various other subscription issues, version issues, roles and permissions issues, and/or other access issues.

In one embodiment, once a user of the software application of PROVIDE A SOFTWARE APPLICATION OPERATION 203 encounters an access blockage or other critical issue, and user critical issue report data is received from a user of the software application, and/or a user computing system associated with the user of the software application, indicating the user has encountered the access issue or other critical issue at RECEIVE USER CRITICAL ISSUE REPORT DATA INDICATING A USER HAS ENCOUNTERED AN ACCESS ISSUE OR OTHER CRITICAL ISSUE OPERATION 209, process flow proceeds to OBTAIN ERROR CODE DATA ASSOCIATED WITH THE USER CRITICAL ISSUE REPORT DATA FROM A USER COMPUTING SYSTEM ASSOCIATED WITH THE USER OF THE SOFTWARE APPLICATION OPERATION 211.

In one embodiment, at OBTAIN ERROR CODE DATA ASSOCIATED WITH THE USER CRITICAL ISSUE REPORT DATA FROM A USER COMPUTING SYSTEM ASSOCIATED WITH THE USER OF THE SOFTWARE APPLICATION OPERATION 211, user error code data associated with the user critical issue of RECEIVE USER CRITICAL ISSUE REPORT DATA INDICATING A USER HAS ENCOUNTERED AN ACCESS ISSUE OR OTHER CRITICAL ISSUE OPERATION 209 is obtained and logged from a user computing system associated with the user of the software application of PROVIDE A SOFTWARE APPLICATION OPERATION 203.

In one embodiment, at OBTAIN ERROR CODE DATA ASSOCIATED WITH THE USER CRITICAL ISSUE REPORT DATA FROM A USER COMPUTING SYSTEM ASSOCIATED WITH THE USER OF THE SOFTWARE APPLICATION OPERATION 211 error code data associated with the user critical issue is obtained using an error code portal service that captures the user error code data.

In one embodiment, the obtained user error code data is stored at OBTAIN ERROR CODE DATA ASSOCIATED WITH THE USER CRITICAL ISSUE REPORT DATA FROM A USER COMPUTING SYSTEM ASSOCIATED WITH THE USER OF THE SOFTWARE APPLICATION OPERATION 211.

In one embodiment, at OBTAIN ERROR CODE DATA ASSOCIATED WITH THE USER CRITICAL ISSUE REPORT DATA FROM A USER COMPUTING SYSTEM ASSOCIATED WITH THE USER OF THE SOFTWARE APPLICATION OPERATION 211 the obtained user error code data is stored in a user error code data portion of a memory.

In one embodiment, once user error code data associated with the user critical issue of RECEIVE USER CRITICAL ISSUE REPORT DATA INDICATING A USER HAS ENCOUNTERED AN ACCESS ISSUE OR OTHER CRITICAL ISSUE OPERATION 209 is obtained and logged from a user computing system associated with the user of the software application of PROVIDE A SOFTWARE APPLICATION OPERATION 203 at OBTAIN ERROR CODE DATA ASSOCIATED WITH THE USER CRITICAL ISSUE REPORT DATA FROM A USER COMPUTING SYSTEM ASSOCIATED WITH THE USER OF THE SOFTWARE APPLICATION OPERATION 211, process flow proceeds to ANALYZE THE ERROR CODE DATA ASSOCIATED WITH THE USER CRITICAL ISSUE REPORT DATA AND DETERMINE A PRE-DEFINED UNLOCK CODE ASSOCIATED WITH THE ERROR CODE DATA ASSOCIATED WITH THE USER CRITICAL ISSUE REPORT DATA OPERATION 213.

In one embodiment, at ANALYZE THE ERROR CODE DATA ASSOCIATED WITH THE USER CRITICAL ISSUE REPORT DATA AND DETERMINE A PRE-DEFINED UNLOCK CODE ASSOCIATED WITH THE ERROR CODE DATA ASSOCIATED WITH THE USER CRITICAL ISSUE REPORT DATA OPERATION 213, the obtained user error code data of OBTAIN ERROR CODE DATA ASSOCIATED WITH THE USER CRITICAL ISSUE REPORT DATA FROM A USER COMPUTING SYSTEM ASSOCIATED WITH THE USER OF THE SOFTWARE APPLICATION OPERATION 211 is analyzed to determine if the obtained user error code data matches the error code data associated with any of the pre-defined unlock code data of CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207.

In one embodiment, at ANALYZE THE ERROR CODE DATA ASSOCIATED WITH THE USER CRITICAL ISSUE REPORT DATA AND DETERMINE A PRE-DEFINED UNLOCK CODE ASSOCIATED WITH THE ERROR CODE DATA ASSOCIATED WITH THE USER CRITICAL ISSUE REPORT DATA OPERATION 213, the obtained user error code data of OBTAIN ERROR CODE DATA ASSOCIATED WITH THE USER CRITICAL ISSUE REPORT DATA FROM A USER COMPUTING SYSTEM ASSOCIATED WITH THE USER OF THE SOFTWARE APPLICATION OPERATION 211 is determined to match the error code data associated with one of the pre-defined unlock codes represented by at least a portion of the pre-defined unlock code data of CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207.

In one embodiment, once the obtained user error code data of OBTAIN ERROR CODE DATA ASSOCIATED WITH THE USER CRITICAL ISSUE REPORT DATA FROM A USER COMPUTING SYSTEM ASSOCIATED WITH THE USER OF THE SOFTWARE APPLICATION OPERATION 211 is determined to match the error code data associated with one of the pre-defined unlock codes represented by at least a portion of the pre-defined unlock code data of CORRELATE PORTIONS OF THE PRE-DEFINED UNLOCK CODE DATA REPRESENTING SPECIFIC PRE-DEFINED UNLOCK CODES WITH THE ASSOCIATED ERROR CODE DATA REPRESENTING THE ASSOCIATED ERROR CODES OPERATION 207, at ANALYZE THE ERROR CODE DATA ASSOCIATED WITH THE USER CRITICAL ISSUE REPORT DATA AND DETERMINE A PRE-DEFINED UNLOCK CODE ASSOCIATED WITH THE ERROR CODE DATA ASSOCIATED WITH THE USER CRITICAL ISSUE REPORT DATA OPERATION 213, process flow proceeds to OBTAIN AUTHENTICATION DATA TO AUTHENTI- CATE THE USER AND ANALYZE THE AUTHENTICATION DATA TO AUTHENTICATE THE USER OPERATION 215.

In one embodiment, at OBTAIN AUTHENTICATION DATA TO AUTHENTICATE THE USER AND ANALYZE THE AUTHENTICATION DATA TO AUTHENTICATE THE USER OPERATION 215, if a match is found between the error code data associated with any of a portion of the pre-defined unlock code data representing a matched pre-defined unlock code, authentication data is obtained to authenticate the user.

In one embodiment, once the user is authenticated at OBTAIN AUTHENTICATION DATA TO AUTHENTICATE THE USER AND ANALYZE THE AUTHENTICATION DATA TO AUTHENTICATE THE USER OPERATION 215, process flow proceeds to PROVIDE THE USER AND/OR THE USER COMPUTING SYSTEM ACCESS TO A PORTION OF THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA OPERATION 217.

In one embodiment, at PROVIDE THE USER AND/OR THE USER COMPUTING SYSTEM ACCESS TO A PORTION OF THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA OPERATION 217, the user and/or the user computing system is provided access to a portion of the pre-defined unlock code data representing the pre-defined unlock code determined to be associated with the error code data of ANALYZE THE ERROR CODE DATA ASSOCIATED WITH THE USER CRITICAL ISSUE REPORT DATA AND DETERMINE A PRE-DEFINED UNLOCK CODE ASSOCIATED WITH THE ERROR CODE DATA ASSOCIATED WITH THE USER CRITICAL ISSUE REPORT DATA OPERATION 213.

In one embodiment, at PROVIDE THE USER AND/OR THE USER COMPUTING SYSTEM ACCESS TO A PORTION OF THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA OPERATION 217, the user and/or the user computing system is provided access to a portion of the pre-defined unlock code data representing the pre-defined unlock code determined to be associated with the error code data via any method for transferring data discussed herein, and/or as known in the art at the time of filing, and/or as developed after the time of filing.

In one embodiment, at PROVIDE THE USER AND/OR THE USER COMPUTING SYSTEM ACCESS TO A PORTION OF THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA OPERATION 217, the user is provided access to the portion of the pre-defined unlock code data representing the pre-defined unlock code determined to be associated with the error code data using one or more action messages and/or pre-defined unlock code data. To this end, in one embodiment, in addition to the software application, a message based action system associated with the software application is provided using one or more computing systems.

As noted above, in one embodiment, the provided message based action system is a loosely coupled message based action framework for dynamically unblocking customers in critical workflows using pre-defined unlock codes that allows the developers and product managers to dynamically control the software application behavior based on the action messages and message actions defined on the server and these message actions can be targeted to a specific user, or a set of users, based on the criteria and error codes defined on the server.

As noted above, as used herein, the term "action message" includes messages used to send customized notification payloads that cause specific operations or actions to occur when a notification is received or activated and that logically, and operationally, connect what the provided software application running on user computing systems does, and what operations it performs on user computing systems, with what the software application provider/software application server sends through the action message.

As also noted above, as used herein, the term "action message system" includes an action message framework that represents and creates a cooperation between the provided software application user's computing system and the action messages sent to the provided software application user's computing system through the software application itself. Consequently, as used herein, the terms "action message system" and "action message framework" do not necessarily mean a mobile or server-side technology on its own, but rather a cooperation between the provided software application user's computing system and the action messages sent to it. Consequently, using an "action message system" the provided software application user's computing system needs to know how to perform tasks indicated in an action message by name, with optional arguments, in certain distinct situations, with an optional result value.

Consequently, in one embodiment, each message action of an action message includes at least the following attributes: condition for the action; context; and action. In one embodiment, the condition for the action attribute supports logical expression with the ability to use any exposed variables in the software application such as, but not limited to, companyId, userId, version code, etc., global and context based. In addition, in one embodiment, a variable called "now" that represents the time in milliseconds from Jan. 1, 1970 midnight GMT is also available.

In one embodiment, the context attribute defines the context or placement when/where the message actions will be executed in the software application, such as, but not limited to, when the software application starts, when an error occurs, or during upgrade flow, etc.

In one embodiment, the actions are predefined actions available in the software application. In one embodiment, actions are identified by name and are registered with the action message system/framework.

In one embodiment, action messages are delivered to the software application user's computing system, i.e., the client, through software application settings. In one embodiment, the key is actionmessages.expr. In one embodiment, each available action includes; 1. A name data field indicating the defined name of the action; 2. A one-time message (otm) data field indicating if the action is executed only once; and 3. An action JSON field indicating any action specific JSON as a string.

As an illustrative example of one embodiment, the actions supported include, but are not limited to, an action and action message action attribute providing a text, or other message form, directing the user to obtain pre-defined unlock codes that appears on the user computing system.

As an illustrative example of one embodiment, the actions supported include, but are not limited to, an action and action message action attribute providing the user one or more pre-defined unlock codes on the user computing system.

As an illustrative example of one embodiment, the actions supported include, but are not limited to, an action and action message action attribute that accesses unlock codes pre-deployed in the software application running on the user computing system.

As an illustrative example of one embodiment, other actions supported include, but are not limited to, an alert action, e.g., an action that shows an alert dialog with ok and cancel buttons. In one embodiment, the following attributes of the alert can be customized:

a. title—the title for the dialog;
 b. message—the message for the dialog;
 c. okCaption—an ok button caption;
 d. cancelCaption—a cancel button caption;
 e. okAction—the definition of the action that needs to be executed when the user clicks the ok button; and
 f. cancelAction—the definition of the action that needs to be executed when the user clicks the cancel button.

As an illustrative example of one embodiment, the actions supported include, but are not limited to, a fullsync action that triggers a full data synchronization.

As an illustrative example of one embodiment, the actions supported include, but are not limited to, a skipsyncerror action that skips a synchronization (sync) error. In one embodiment, the skipsyncerror action is used for parsing errors.

As an illustrative example of one embodiment, the actions supported include, but are not limited to, an alogsyncerror action that logs sync error details including logging JSON response data.

As an illustrative example of one embodiment, the actions supported include, but are not limited to, a goforupgrade action that takes the user to the software application upgrade flow.

As an illustrative example of one embodiment, the actions supported include, but are not limited to, a dynamic action that dynamically adds an action message to execute at a later time or event.

Although specific illustrative examples of actions are discussed above, those of skill in the art will recognize that different, more, or less, actions can be defined and implemented using different, similar, or the same nomenclature/symbols and functionality. Consequently, the specific action examples discussed herein are presented as illustrative examples only and do not limit the scope of the claims presented below.

In one embodiment, an audit trial record data associated with the pre-defined unlock code data representing the pre-defined unlock code determined to be associated with the error code data associated with the user critical issue report data is generated and stored at PROVIDE THE USER AND/OR THE USER COMPUTING SYSTEM ACCESS TO A PORTION OF THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA OPERATION 217.

In one embodiment, once the user and/or the user computing system is provided access to a portion of the pre-defined unlock code data representing the pre-defined unlock code determined to be associated with the error code data of ANALYZE THE ERROR CODE DATA ASSOCIATED WITH THE USER CRITICAL ISSUE REPORT DATA AND DETERMINE A PRE-DEFINED UNLOCK CODE ASSOCIATED WITH THE ERROR CODE DATA ASSOCIATED WITH THE USER CRITICAL ISSUE REPORT DATA OPERATION 213 at PROVIDE THE USER AND/OR THE USER COMPUTING SYSTEM ACCESS TO A PORTION OF THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA OPERATION 217, process flow proceeds to RECEIVE THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA FROM THE USER OPERATION 219.

In one embodiment, once the pre-defined unlock code data representing the pre-defined unlock code determined to be associated with the error code data is accessed by the user, the user obtains and enters the pre-defined unlock code data representing the pre-defined unlock code determined to be associated with the error code data through the software application and/or the user computing system at RECEIVE THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA FROM THE USER OPERATION 219.

In one embodiment, once the pre-defined unlock code data representing the pre-defined unlock code determined to be associated with the error code data is accessed by the user, and the user obtains and enters the pre-defined unlock code data representing the pre-defined unlock code determined to be associated with the error code data through the software application and/or the user computing system at RECEIVE THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA FROM THE USER OPERATION 219, process flow proceeds to ALLOW THE USER TO PROCEED TO UTILIZE THE APPLICATION FROM THE USER COMPUTING SYSTEM OPERATION 221.

In one embodiment, once the pre-defined unlock code data representing the pre-defined unlock code determined to be associated with the error code data of the user critical issue report data is received from the user RECEIVE THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA FROM THE USER OPERATION 219, the user is allowed to proceed to utilize the application from the user computing system, at least until a long-term solution can be formulated and implemented, at ALLOW THE USER TO PROCEED TO UTILIZE THE APPLICATION FROM THE USER COMPUTING SYSTEM OPERATION 221.

In one embodiment, once the pre-defined unlock code data representing the pre-defined unlock code determined to be associated with the error code data of the user critical issue report data is received from the user RECEIVE THE PRE-DEFINED UNLOCK CODE DATA REPRESENTING THE PRE-DEFINED UNLOCK CODE DETERMINED TO BE ASSOCIATED WITH THE ERROR CODE DATA ASSOCIATED WITH THE USER CRITICAL ISSUE REPORT DATA FROM THE USER OPERATION 219, and the user is allowed to proceed to utilize the application from the user computing system, at least until a long-term solution can be formulated and implemented, at ALLOW THE USER TO PROCEED TO UTILIZE THE APPLICATION FROM THE USER COMPUTING SYSTEM OPERATION 221, process flow proceeds to EXIT OPERATION 230.

In one embodiment, at EXIT OPERATION 230 process 200 for dynamically unblocking customers in critical workflows using pre-defined unlock codes is exited to await new data.

Process 200 for dynamically unblocking customers in critical workflows using pre-defined unlock codes provides for unblocking customers/users of a software application without a need for applying a data fix or releasing a patch or new application version, in the interim, until a long-term solution can be formulated and implemented. Therefore, process 200 for dynamically unblocking customers in critical workflows using pre-defined unlock codes solves the long standing technical problem in the workflow application environment of users of a software application getting stuck and blocked from making progress with their workflows due to access, permissions, role, and/or other critical issues while a long-term solution is formulated and implemented.

Process 200 for dynamically unblocking customers in critical workflows using pre-defined unlock codes does not encompass, embody, or preclude other forms of innovation in the area of distributed workflow applications. In addition, process 200 for dynamically unblocking customers in critical workflows using pre-defined unlock codes is not related to any fundamental economic practice, mental steps, or pen and paper based solutions, and is, in fact, directed to providing solutions to relatively new problems associated with distributed workflow applications. Consequently, process 200 for dynamically unblocking customers in critical workflows using pre-defined unlock codes is not directed to, does not encompass, and is not merely, an abstract idea or concept.

In addition, process 200 for dynamically unblocking customers in critical workflows using pre-defined unlock codes provides for significant improvements to the technical fields of customer support, information dissemination, software implementation, user experience, data processing, data management, distributed workflow applications, client server applications, and real time application fixes.

In addition process 200 for dynamically unblocking customers in critical workflows using pre-defined unlock codes provides for the processing of only relevant portions of data and data analysis, such as relevant error codes and unlock codes, before the data is further analyzed, processed and/or transmitted or distributed. Consequently, using process 200 for dynamically unblocking customers in critical workflows using pre-defined unlock codes results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing process 200 for dynamically unblocking customers in critical workflows using pre-defined unlock codes.

Figure 3:
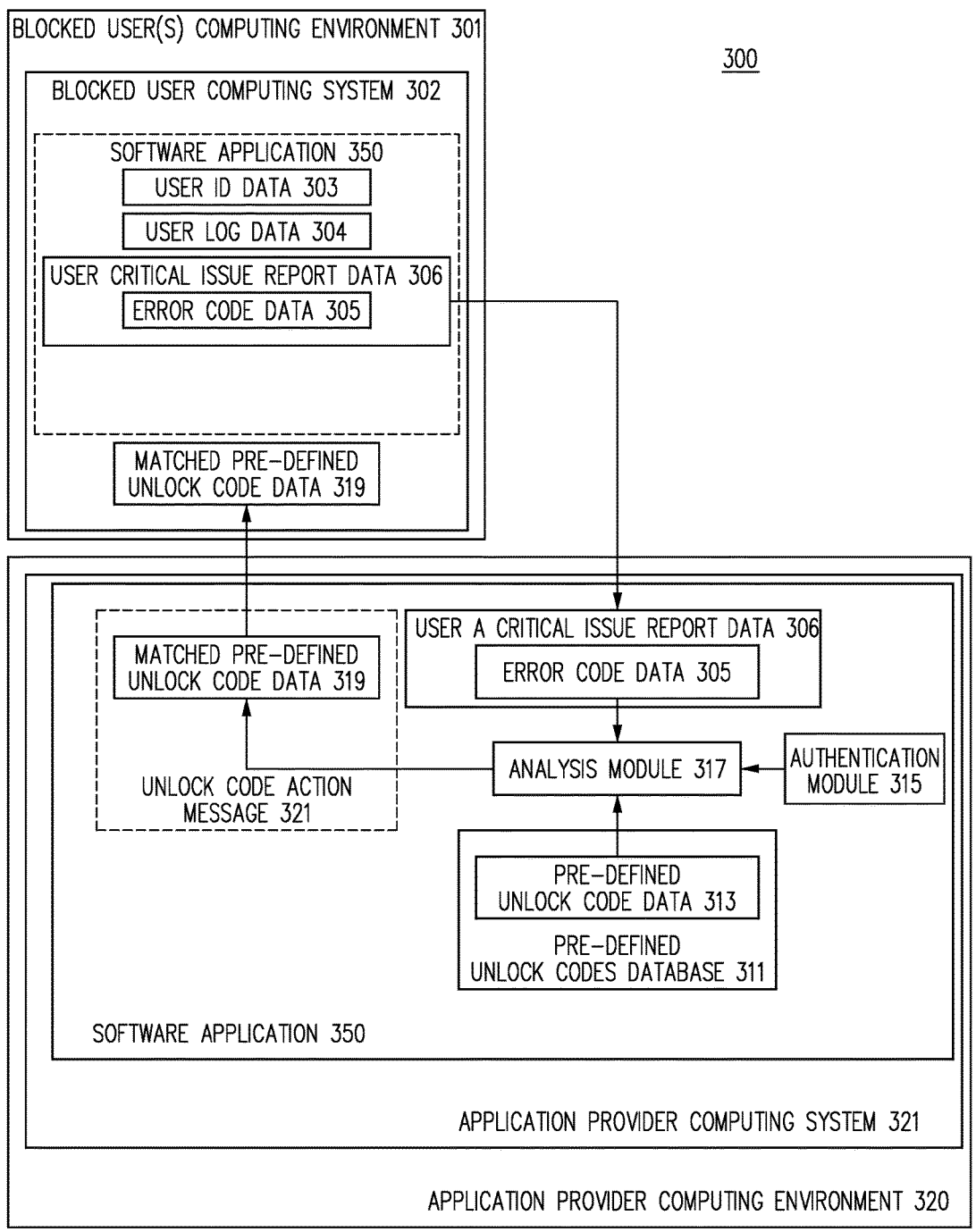
FIG. 3 is a block diagram of a hardware and production environment for providing a process for dynamically unblocking customers in critical workflows using pre-defined unlock codes, in accordance with one embodiment.

FIG. 3 is a generalized and simplified block diagram of a hardware and production environment 300 for providing a process for dynamically unblocking customers in critical workflows using pre-defined unlock codes, in accordance with one embodiment.

As seen in FIG. 3, in this specific illustrative example, production environment 300 includes: blocked user computing environment 301, including blocked user computing system 302; application provider computing environment 320, including application provider computing system 321 providing software application 350, and pre-defined unlock codes database 311, analysis module 317, and authentication module 315.

In various embodiments, blocked user (s) computing environment 301 and application provider computing environment 320 are any computing environments as discussed herein, and/or as known in the art at the time of filing, and/or as developed after the time of filing. In various embodiments, blocked user (s) computing environment 301 and application provider computing environment 320 can be combined, or further divided, into fewer, or more, computing environments.

As seen in FIG. 3, in this specific illustrative example, blocked user computing system 302, associated with a blocked user of software application 350 is operating in blocked user (s) computing environment 301.

As also seen in FIG. 3, in this specific illustrative example, blocked user computing system 302 includes, and implements, at least part of software application 350. In this specific illustrative example, software application 350 obtains/includes user ID data 303 and user log data 305.

As also seen in FIG. 3, in this specific illustrative example, software application 350 includes critical issue report data 306 that is generated when the user encounters any of the access and/or critical issues discussed herein. As also seen in FIG. 3, in this specific illustrative example, user critical report data 306 includes error code data 305.

In this specific illustrative example, when user encounters any of the access and/or critical issues discussed herein, user critical report data 306 is obtained by software application 350 and error code data 305 is captured/extracted.

As seen in FIG. 3, in this specific illustrative example, error code data 305 is provided to analysis module 317.

In one embodiment, analysis module 317 analyzes error code data 305 to determine if any of the unlock codes in pre-defined unlock code data 313 of per-defined unlock codes database 311 matches error code data 305. In addition, authentication module 315 performs several functions/checks such as, but not limited to: checking whether the user is authorized to use the unlock mechanism; checking whether the feature and error code qualify for unlock/override; and/or checking the number of times the unlock code/feature has been used in a defined time interval, e.g., has any use limitation been exceeded.

In one embodiment, if the rules and checks of authentication module 315 are satisfied, matched pre-defined unlock code data 319 is generated representing an unlock code that is valid for a defined time interval, and/or number of uses.

In one embodiment, matched pre-defined unlock code data 319 is then provided to software application 350 of blocked user computing system 302. In one embodiment, matched pre-defined unlock code data 319 is then provided to software application 350 of blocked user computing system 302 via unlock code action message 321. In one embodiment, once the pre-defined unlock code data representing the pre-defined unlock code determined to be associated with the error code data represented by matched pre-defined unlock code data 319 is accessed by the user, the user obtains and enters matched pre-defined unlock code data 319 representing the pre-defined unlock code determined to be associated with error code data 305 through software application 350 and/or blocked user computing system 302.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "designating," "categorizing," "receiving," "transmitting," "implementing," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for dynamically unblocking customers in critical workflows using pre-defined unlock codes, the method comprising:

providing a software application to one or more users using one or more computing systems;

using one or more processors to:
- generate pre-defined unlock code data representing pre-defined unlock codes to be associated with defined error codes data representing defined error codes;
- correlate portions of the pre-defined unlock code data representing specific pre-defined unlock codes with the associated error code data representing the associated error codes;
- receive user critical issue report data indicating a user has encountered an access issue or other critical issue
- obtain error code data associated with the user critical issue report data from a user computing system associated with the user of the software application;
- analyze the error code data associated with the user critical issue report data and determine a pre-defined unlock code associated with the error code data associated with the user critical issue report data;
- obtain authentication data to authenticate the user;
- analyze the authentication data and authenticate the user;
- provide a portion of the pre-defined unlock code data representing the pre-defined unlock code determined to be associated with the error code data associated with the user critical issue report data to the user and/or the user computing system;

the user providing the pre-defined unlock code data representing the pre-defined unlock code determined to be associated with the error code data associated with the user critical issue report data provided to the user through the software application and/or the user computing system; and using the one or more processors to allow the user to proceed to utilize the application from the user computing system.

2. The method for dynamically unblocking customers in critical workflows using pre-defined unlock codes of claim 1 wherein the software application is provided to one or more users via a workflow application framework.

3. The method for dynamically unblocking customers in critical workflows using pre-defined unlock codes of claim 1 wherein the defined error codes include an error code indicating an invalid subscription error associated with the user for the software application.

4. The method for dynamically unblocking customers in critical workflows using pre-defined unlock codes of claim 1 wherein the defined error codes include an error code indicating an expired subscription error associated with the user for the software application.

5. The method for dynamically unblocking customers in critical workflows using pre-defined unlock codes of claim 1 wherein the defined error codes include an error code indicating a permissions-based entitlement error associated with the user for the software application.

6. The method for dynamically unblocking customers in critical workflows using pre-defined unlock codes of claim 1 wherein the defined error codes include an error code indicating a role-based entitlement error associated with the user for the software application.

7. The method for dynamically unblocking customers in critical workflows using pre-defined unlock codes of claim 1 further comprising:
- using the one or more processors to create audit trail record data associated with the pre-defined unlock code data representing the pre-defined unlock code determined to be associated with the error code data associated with the user critical issue report data.

8. The method for dynamically unblocking customers in critical workflows using pre-defined unlock codes of claim 1 wherein the pre-defined unlock code data representing the pre-defined unlock code determined to be associated with the error code data associated with the user critical issue report data provided to the user includes use limitation data indicating a use timeframe for the pre-defined unlock code data representing the pre-defined unlock code determined to be associated with the error code data associated with the user critical issue report data provided to the user.

9. The method for dynamically unblocking customers in critical workflows using pre-defined unlock codes of claim 1 wherein the pre-defined unlock code data representing the pre-defined unlock code determined to be associated with the error code data associated with the user critical issue report data provided to the user includes use limitation data indicating a maximum number of times the pre-defined unlock code data representing the pre-defined unlock code determined to be associated with the error code data associated with the user critical issue report data provided to the user can be utilized.

10. The method for dynamically unblocking customers in critical workflows using pre-defined unlock codes of claim 1 wherein the portion of the pre-defined unlock code data representing the pre-defined unlock code determined to be associated with the error code data associated with the user critical issue report data is provided to the user and/or the user computing system using an action message, the action message including an action message action attribute selected form the group of action message action attributes consisting of:
- a first action message action attribute directing the user to obtain pre-defined unlock codes;
- a second action message action attribute that provides the user one or more pre-defined unlock codes; and
- a third action message action attribute that accesses unlock codes pre-deployed in the software application running on the user computing system.

11. A system for dynamically unblocking customers in critical workflows using pre-defined unlock codes, the system comprising:
- one or more computing systems, the one or more computing systems each having computing processors and memory, the one or more computing systems comprising:
- a software application provided to one or more users;
- a pre-defined unlock code database including pre-defined unlock code data representing pre-defined unlock codes, specific portions of the pre-defined unlock code data representing specific pre-defined unlock codes correlated with associated error code data representing defined associated error codes;
- a user critical issue report data receiving module to receive user critical issue report data indicating a user has encountered an access issue or other critical issue
- an error code acquisition module directing one or more processors to obtain error code data associated with the user critical issue report data from a user computing system associated with the user of the software application;
- an analysis module directing one or more processors to analyze the error code data associated with the user critical issue report data and determine a pre-defined unlock code associated with the error code data associated with the user critical issue report data;

an authentication module directing one or more processors to obtain authentication data to authenticate the user;

a pre-defined unlock code data access module using one or more processors to provide a portion of the pre-defined unlock code data representing the pre-defined unlock code determined to be associated with the error code data associated with the user critical issue report data to the user and/or the user computing system;

a pre-defined unlock code data receiving module for receiving user provided pre-defined unlock code data representing the pre-defined unlock code determined to be associated with the error code data associated with the user critical issue report data provided to the user through the pre-defined unlock code data access module; and an unlock module directing one or more processors to unlock the software application upon receipt of the user provided pre-defined unlock code data representing the pre-defined unlock code determined to be associated with the error code data associated with the user critical issue report data by the pre-defined unlock code data receiving module and thereby allow the user to proceed to utilize the application from the user computing system.

12. The system for dynamically unblocking customers in critical workflows using pre-defined unlock codes of claim 11 wherein the software application is provided to one or more users via a workflow application framework.

13. The system for dynamically unblocking customers in critical workflows using pre-defined unlock codes of claim 11 wherein the defined error codes include an error code indicating an invalid subscription error associated with the user for the software application.

14. The system for dynamically unblocking customers in critical workflows using pre-defined unlock codes of claim 11 wherein the defined error codes include an error code indicating an expired subscription error associated with the user for the software application.

15. The system for dynamically unblocking customers in critical workflows using pre-defined unlock codes of claim 11 wherein the defined error codes include an error code indicating a permissions-based entitlement error associated with the user for the software application.

16. The system for dynamically unblocking customers in critical workflows using pre-defined unlock codes of claim 11 wherein the defined error codes include an error code indicating a role-based entitlement error associated with the user for the software application.

17. The system for dynamically unblocking customers in critical workflows using pre-defined unlock codes of claim 11 further comprising:
audit trail record data of the one or more computing systems, the audit trail record data associated with the pre-defined unlock code data representing the pre-defined unlock code determined to be associated with the error code data associated with the user critical issue report data.

18. The system for dynamically unblocking customers in critical workflows using pre-defined unlock codes of claim 11 wherein the pre-defined unlock code data representing the pre-defined unlock code determined to be associated with the error code data associated with the user critical issue report data provided to the user includes use limitation data indicating a use timeframe for the pre-defined unlock code data representing the pre-defined unlock code determined to be associated with the error code data associated with the user critical issue report data provided to the user.

19. The system for dynamically unblocking customers in critical workflows using pre-defined unlock codes of claim 11 wherein the pre-defined unlock code data representing the pre-defined unlock code determined to be associated with the error code data associated with the user critical issue report data provided to the user includes use limitation data indicating a maximum number of times the pre-defined unlock code data representing the pre-defined unlock code determined to be associated with the error code data associated with the user critical issue report data provided to the user can be utilized.

20. The system for dynamically unblocking customers in critical workflows using pre-defined unlock codes of claim 11 wherein the portion of the pre-defined unlock code data representing the pre-defined unlock code determined to be associated with the error code data associated with the user critical issue report data is provided to the user and/or the user computing system using an action message, the action message including an action message action attribute selected form the group of action message action attributes consisting of:
a first action message action attribute directing the user to obtain pre-defined unlock codes;
a second action message action attribute that provides the user one or more pre-defined unlock codes; and
a third action message action attribute that accesses unlock codes pre-deployed in the software application running on the user computing system.

21. A method for dynamically unblocking customers in critical workflows using pre-defined unlock codes, the method comprising:
providing a software application to one or more users using one or more computing systems;
providing one or more processors which:
generate pre-defined unlock code data representing pre-defined unlock codes to be associated with defined error codes data representing defined error codes;
correlate portions of the pre-defined unlock code data representing specific pre-defined unlock codes with the associated error code data representing the associated error codes;
receive user critical issue report data indicating a user of the software application has encountered an access issue or other critical issue
obtain error code data associated with the user critical issue report data from a user computing system associated with the user of the software application;
analyze the error code data associated with the user critical issue report data and determine a pre-defined unlock code associated with the error code data associated with the user critical issue report data;
obtain authentication data to authenticate the user;
analyze the authentication data and authenticate the user; and
generate an unlock action message, the unlock action message providing the user access to a portion of the pre-defined unlock code data representing the pre-defined unlock code determined to be associated with the error code data associated with the user critical issue report data to the user and/or the user computing system;
the user providing the pre-defined unlock code data representing the pre-defined unlock code determined to be associated with the error code data associated with the user critical issue report data provided to the user through the software application and/or the user computing system; and using the one or more processors to allow the user to proceed to utilize the application from the user computing system.

22. The method for dynamically unblocking customers in critical workflows using pre-defined unlock codes of claim 21 wherein the software application is provided to one or more users via a workflow application framework.

23. The method for dynamically unblocking customers in critical workflows using pre-defined unlock codes of claim 21 wherein the defined error codes include an error code indicating an invalid subscription error associated with the user for the software application.

24. The method for dynamically unblocking customers in critical workflows using pre-defined unlock codes of claim 21 wherein the defined error codes include an error code indicating an expired subscription error associated with the user for the software application.

25. The method for dynamically unblocking customers in critical workflows using pre-defined unlock codes of claim 21 wherein the defined error codes include an error code indicating a permissions-based entitlement error associated with the user for the software application.

26. The method for dynamically unblocking customers in critical workflows using pre-defined unlock codes of claim 21 wherein the defined error codes include an error code indicating a role-based entitlement error associated with the user for the software application.

27. The method for dynamically unblocking customers in critical workflows using pre-defined unlock codes of claim 21 further comprising:

using the one or more processors to create audit trail record data associated with the pre-defined unlock code data representing the pre-defined unlock code determined to be associated with the error code data associated with the user critical issue report data.

28. The method for dynamically unblocking customers in critical workflows using pre-defined unlock codes of claim 21 wherein the pre-defined unlock code data representing the pre-defined unlock code determined to be associated with the error code data associated with the user critical issue report data provided to the user includes use limitation data indicating a use timeframe for the pre-defined unlock code data representing the pre-defined unlock code determined to be associated with the error code data associated with the user critical issue report data provided to the user.

29. The method for dynamically unblocking customers in critical workflows using pre-defined unlock codes of claim 21 wherein the pre-defined unlock code data representing the pre-defined unlock code determined to be associated with the error code data associated with the user critical issue report data provided to the user includes use limitation data indicating a maximum number of times the pre-defined unlock code data representing the pre-defined unlock code determined to be associated with the error code data associated with the user critical issue report data provided to the user can be utilized.

30. The method for dynamically unblocking customers in critical workflows using pre-defined unlock codes of claim 21 wherein the portion of the pre-defined unlock code data representing the pre-defined unlock code determined to be associated with the error code data associated with the user critical issue report data is provided to the user and/or the user computing system using an action message, the action message including an action message action attribute selected form the group of action message action attributes consisting of:

an action message action attribute directing the user to obtain pre-defined unlock codes;

an action message action attribute that provides the user one or more pre-defined unlock codes; and an action message action attribute that accesses unlock codes pre-deployed in the software application running on the user computing system.

31. A method for dynamically unblocking customers in critical workflows using pre-defined unlock codes, the method comprising:

using one or more processors to:

provide a software application to one or more users using one or more computing systems;

provide an action message framework using one or more computing system;

generate pre-defined unlock code data representing unlock codes to be associated with defined error code data representing defined error codes;

correlate portions of the pre-defined unlock code data representing specific pre-defined unlock codes with associated error code data to generate correlated pre-defined unlock code data using one or more processors;

store the correlated pre-defined unlock code data in a correlated pre-defined unlock code data section of a memory on a user computing system;

receive user critical issue report data indicating the user has encountered an access issue or other critical issue;

generate a log data collection action message, the log data collection action message causing user log error data and error code data associated with the user critical issue report data to be obtained from the user computing system;

access the correlated pre-defined unlock code data in the correlated pre-defined unlock code data section of the memory on the user computing system and determine a pre-defined unlock code associated with the error code data associated with the user critical issue report data;

generate an authentication action message, the authentication action message causing authentication data to authenticate the user to be obtained;

provide the unlock code data representing the unlock code determined to be associated with the error code associated with the user critical issue report data; and to allow the user to proceed to utilize the application from the user computing system.

32. The method for dynamically unblocking customers in critical workflows using pre-defined unlock codes of claim 31 wherein the software application is provided to one or more users via a workflow application framework.

33. The method for dynamically unblocking customers in critical workflows using pre-defined unlock codes of claim 31 wherein the defined error codes include an error code indicating an invalid subscription error associated with the user for the software application.

34. The method for dynamically unblocking customers in critical workflows using pre-defined unlock codes of claim 31 wherein the defined error codes include an error code indicating an expired subscription error associated with the user for the software application.

35. The method for dynamically unblocking customers in critical workflows using pre-defined unlock codes of claim

31 wherein the defined error codes include an error code indicating a permissions-based entitlement error associated with the user for the software application.

36. The method for dynamically unblocking customers in critical workflows using pre-defined unlock codes of claim 31 wherein the defined error codes include an error code indicating a role-based entitlement error associated with the user for the software application.

37. The method for dynamically unblocking customers in critical workflows using pre-defined unlock codes of claim 31 wherein the pre-defined unlock code data representing the pre-defined unlock code determined to be associated with the error code data associated with the user critical issue report data provided to the user includes use limitation data indicating a use timeframe for the pre-defined unlock code data representing the pre-defined unlock code determined to be associated with the error code data associated with the user critical issue report data provided to the user.

38. The method for dynamically unblocking customers in critical workflows using pre-defined unlock codes of claim 31 wherein the pre-defined unlock code data representing the pre-defined unlock code determined to be associated with the error code data associated with the user critical issue report data provided to the user includes use limitation data indicating a maximum number of times the pre-defined unlock code data representing the pre-defined unlock code determined to be associated with the error code data associated with the user critical issue report data provided to the user can be utilized.

* * * * *